US012669905B2

(12) United States Patent
Miyazaki

(10) Patent No.: US 12,669,905 B2
(45) Date of Patent: Jun. 30, 2026

(54) TOUCH SENSOR AND DISPLAY DEVICE

(71) Applicant: Sharp Display Technology Corporation, Kameyama City (JP)

(72) Inventor: Shinichi Miyazaki, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/833,942

(22) PCT Filed: Mar. 30, 2022

(86) PCT No.: PCT/JP2022/015877
§ 371 (c)(1),
(2) Date: Jul. 29, 2024

(87) PCT Pub. No.: WO2023/188080
PCT Pub. Date: Oct. 5, 2023

(65) Prior Publication Data
US 2025/0117101 A1 Apr. 10, 2025

(51) Int. Cl.
*G06F 3/044* (2006.01)
(52) U.S. Cl.
CPC .. *G06F 3/0446* (2019.05); *G06F 2203/04112* (2013.01)

(58) Field of Classification Search
CPC .................. G06F 3/0446; G06F 3/047; G06F 2203/04112; G06F 2203/04113; G06F 3/041; G06F 3/0412; G06F 3/044; G06F 3/0448
See application file for complete search history.

(56) References Cited

U.S. PATENT DOCUMENTS

| | | | |
|---|---|---|---|
| 2016/0139733 A1 | 5/2016 | Noguchi et al. | |
| 2017/0102804 A1* | 4/2017 | Kikukawa | G06F 3/047 |
| 2017/0160863 A1 | 6/2017 | Suzuki | |
| 2019/0163317 A1 | 5/2019 | Suzuki | |
| 2019/0189699 A1 | 6/2019 | Ye | |
| 2019/0250738 A1 | 8/2019 | Lee | |
| 2021/0373708 A1* | 12/2021 | Kim | G06F 3/0412 |

FOREIGN PATENT DOCUMENTS

| | | | |
|---|---|---|---|
| JP | 2016-099693 A | 5/2016 | |
| JP | 2017-102811 A | 6/2017 | |
| JP | 2018-152122 A | 9/2018 | |
| WO | 2015/156316 A1 | 10/2015 | |

\* cited by examiner

*Primary Examiner* — Robin J Mishler
(74) *Attorney, Agent, or Firm* — ScienBiziP, P.C.

(57) ABSTRACT

A touch sensor includes: a first conductor including a net-like wiring line; and a second conductor adjacent to the first conductor and including a net-like wiring line. At least a part of a boundary portion between the first conductor and the second conductor extends in a first direction, and the net-like wiring line of the first conductor includes a plurality of disconnection points formed such that a disconnection edge intersects the first direction in a plan view.

20 Claims, 5 Drawing Sheets

10

AM

W2

F2

SD EK

EK

ED

ED K

W2

K

AM

K

W1

ED

EK

EK

BS

F1

K2(K) K1(K)

LS

ED

W1

K

D2

D1

W1 ED    K    ED W1

D2

D1

TOUCH SENSOR AND DISPLAY DEVICE

TECHNICAL FIELD

The disclosure relates to a touch sensor and a display device.

BACKGROUND ART

PTL 1 discloses a structure of a touch sensor using a metal mesh.

CITATION LIST

Patent Literature

PTL 1: JP 2018-152122 A

SUMMARY

Technical Problem

When the touch sensor is applied to a display panel, display unevenness due to the touch sensor may be visually recognized.

Solution to Problem

A touch sensor according to the disclosure includes: a first conductor including a net-like wiring line; and a second conductor adjacent to the first conductor and including a net-like wiring line. At least a part of a boundary portion between the first conductor and the second conductor extends in a first direction, and the net-like wiring line of the first conductor includes a plurality of disconnection points in which a disconnection edge intersects the first direction in a plan view.

Advantageous Effects of Disclosure

According to an aspect of the disclosure, display unevenness due to the touch sensor is reduced when the touch sensor is applied to a display panel.

DESCRIPTION OF EMBODIMENTS

Figure 1:
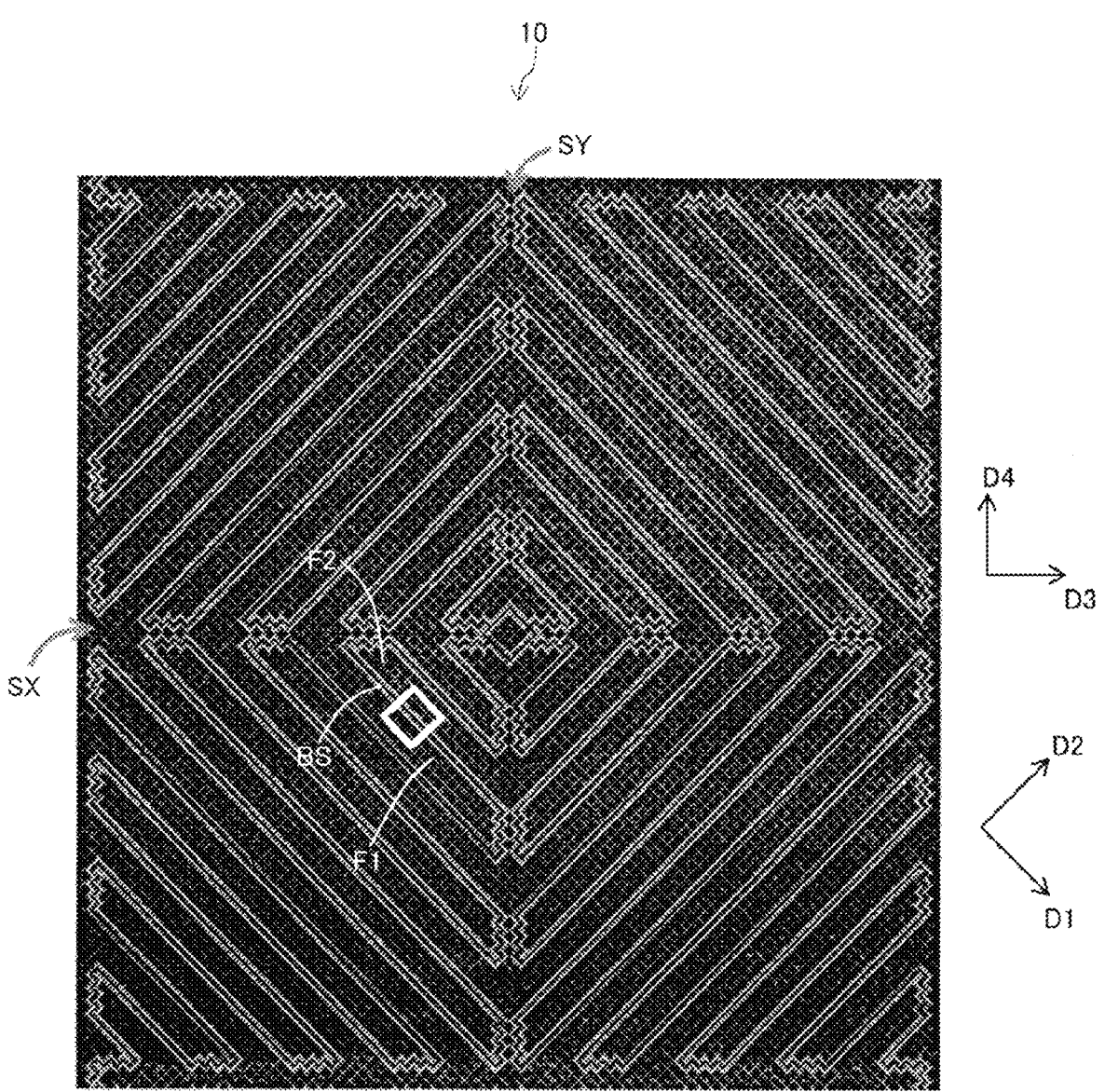
FIG. 1 is a plan view illustrating a configuration of a touch sensor according to a first embodiment.
Figures 2, 3:
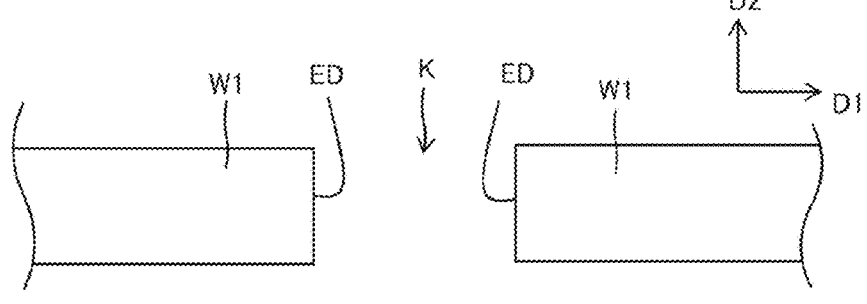
FIG. 2 is an enlarged plan view illustrating a configuration of a region surrounded by white lines in FIG. 1.
FIG. 3 is a plan view illustrating a configuration of a disconnection point in FIG. 2.

FIG. 1 is a plan view illustrating a configuration of a touch sensor according to a first embodiment. FIG. 2 is an enlarged plan view illustrating a configuration of a region surrounded by white lines in FIG. 1. FIG. 3 is a plan view illustrating a configuration of a disconnection point in FIG. 2. As illustrated in FIGS. 1 to 3, a touch sensor 10 includes a first conductor F1 including a net-like wiring line (for example, a metal mesh) W1 and a second conductor F2 adjacent to the first conductor F1 and including a net-like wiring line W2. At least a part of a boundary portion BS between the first conductor F1 and the second conductor F2 extends in a first direction D1, and the net-like wiring line W1 of the first conductor F1 includes a plurality of disconnection points K formed so that a disconnection edge ED intersects with the first direction D1 in a plan view. A second direction D2 is a direction orthogonal to the first direction D1. The plan view is based on a line of sight parallel to the thickness direction of the touch sensor 10, for example, and includes see-through visual recognition.

The second conductor F2 is electrically insulated from the first conductor F1, and the net-like wiring line F2 of the second conductor W2 includes a plurality of disconnection points K formed so that the disconnection edge ED intersects the first direction D1 in a plan view. The disconnection edge ED may be substantially orthogonal to the first direction D1, and the net-like wiring lines W1 and W2 have light reflectivity.

In a configuration in which the boundary portion BS extends in the first direction D1 and the disconnection point K is not provided in the net-like wiring line, directivity occurs in the light reflectivity. That is, the reflectivity of light incident on the first and second conductors F1 and F2 in the first direction D1 is lower than that of light incident on the first and second conductors F1 and F2 in the second direction D2.

On the other hand, in the touch sensor 10 illustrated in FIGS. 1 to 3, since the disconnection edge ED includes the plurality of disconnection points K intersecting the first direction D1 in a plan view, it is possible to suppress the reflectivity of light incident on the first and second conductors F1 and F2 in the second direction D2 as compared with a configuration in which the disconnection points K are not provided. Thus, the directivity of the light reflectivity is reduced, and the display quality (for example, display unevenness) of the display panel including the touch sensor 10 can be improved.

Figure 4:
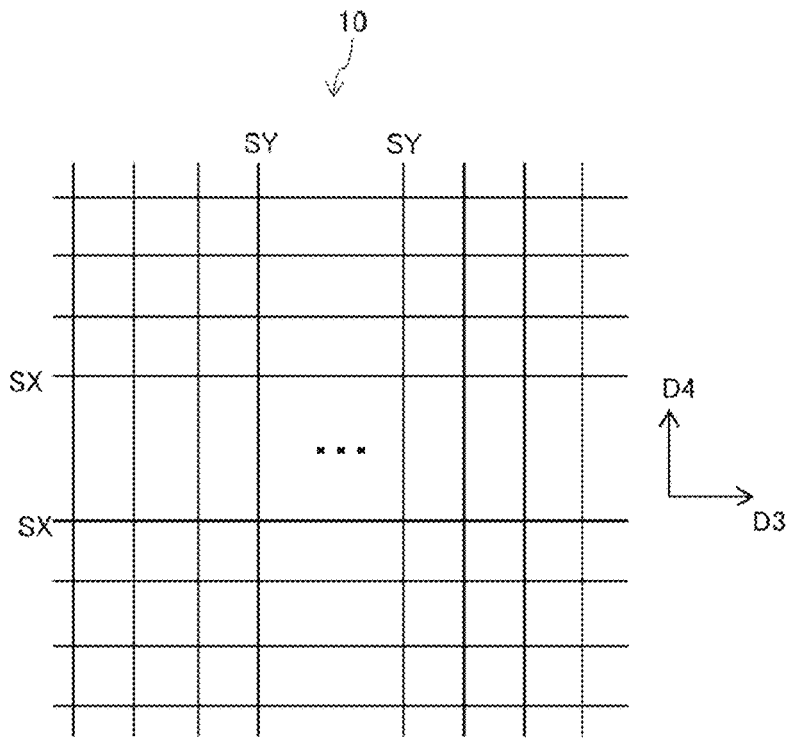
FIG. 4 is a schematic view illustrating a configuration of the touch sensor.

FIG. 4 is a schematic view illustrating a configuration of the touch sensor. The touch sensor 10 includes a plurality of first sensing lines SX extending in a third direction D3 (e.g., horizontal direction) forming +45 degrees or −45 degrees with the first direction D1 and a plurality of second sensing lines SY extending in a fourth direction D4 (e.g., vertical direction) orthogonal to the third direction D3. The first conductor F1 may be included in one of the plurality of first sensing lines SX and the second conductor F2 may be included in one of the plurality of second sensing lines SY.

Figure 5:
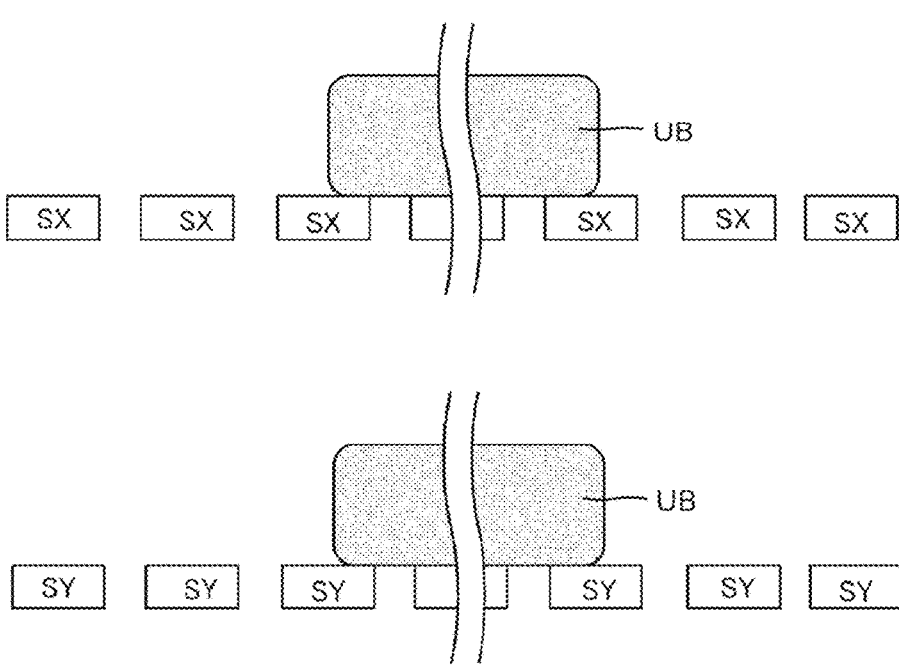
FIG. 5 is a schematic cross-sectional view illustrating an operation principle of the touch sensor.

FIG. 5 is a schematic cross-sectional view illustrating an operation principle of the touch sensor. When a sensing target UB such as a finger approaches or touches the touch sensor, the electrostatic capacitance of a specific first sensing line SX and a specific second sensing line SY changes, and a sensing current read from the capacitance changes. Accordingly, the position of the sensing target UB such as a finger is specified.

As illustrated in FIGS. 1 and 2, in the net-like wiring line W1 of the first conductor F1, the plurality of disconnection points K are provided so that a current path can be formed in the entire net-like wiring line W1. Similarly, in the net-like wiring line W2 of the second conductor F2, the plurality of disconnection points K are provided so that a current path can be formed in the entire net-like wiring line W2. The mesh of each of the net-like wiring lines W1 and W2 may be a rectangle (for example, a square) having sides parallel to the first direction D1 and sides parallel to the second direction D2. In the first conductor F1, two disconnection points K1 and K2 arranged in a second direction D2 orthogonal to the first direction D1 may be provided in an annular portion surrounding a mesh AM. The outer shape of each of the first conductor F1 and the second conductor F2 may be a V shape.

As illustrated in FIG. 2, with the two disconnection points K1 and K2 formed in the annular portion surrounding the mesh AM as a lattice cut portions LS, a plurality of lattice cut portions LS may be positioned in a zig-zag shape when viewed in the second direction D2. The width of the boundary portion BS (size in the second direction D2) may be equal to or less than twice the mesh diameter of the first conductor F1. In each of the net-like wiring line F1 of the first conductor W1 and the net-like wiring line F2 of the second conductor W2, the disconnection point may not be formed in the portion extending in the second direction D2.

Figure 6:
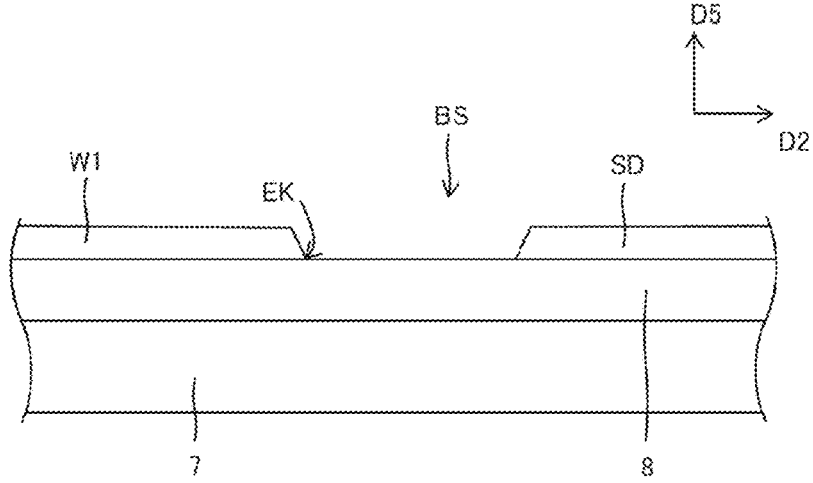
FIG. 6 is a cross-sectional view illustrating a configuration of the touch sensor.
Figure 7:
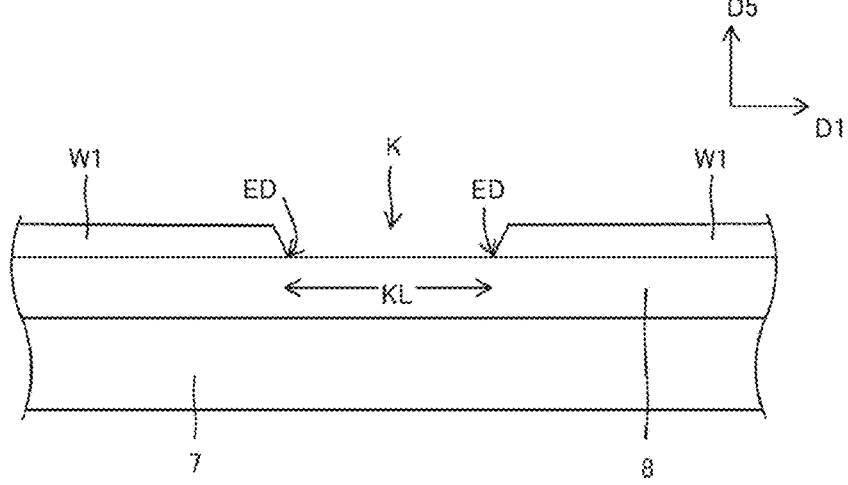
FIG. 7 is a cross-sectional view illustrating a configuration of the touch sensor.
Figure 8:
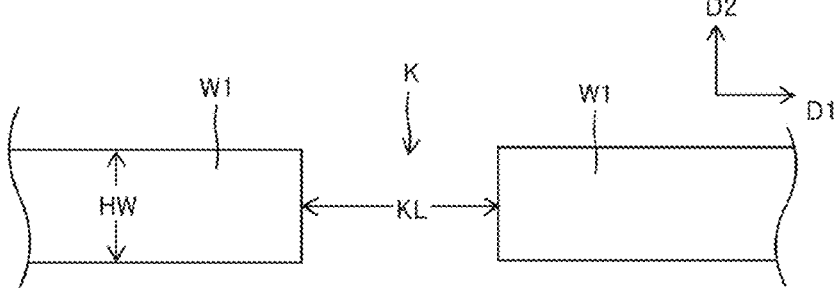
FIG. 8 is a plan view illustrating a configuration of the touch sensor.

FIG. 6 and FIG. 7 are cross-sectional views illustrating configurations of the touch sensor. FIG. 8 is a plan view illustrating a configuration of the touch sensor. A fifth direction D5 is a thickness direction of the net-like wiring line. In the touch sensor 10, a base coat film 7, an interlayer insulating film 8, and the net-like wiring lines W1 and W2 may be formed in this order. An overcoat film (not illustrated) covering the net-like wiring lines W1 and W2 may be formed. Each of the net-like wiring lines W1 and W1 may be formed of a layered body of metal films. The layered body may include a titanium film and an aluminum film.

As illustrated in FIGS. 2 and 6, each of the net-like wiring line W1 of the first conductor F1 and the net-like wiring line W2 of the second conductor F2 has a plurality of boundary edges EK facing the boundary portion BS. In the first conductor F1, when the total number of boundary edges EK facing the boundary portion BS is M and the number of disconnection points K is N, N/M=0.75 to 1.25 can be established. With this configuration, the reflectivity of light incident on the first and second conductors F1 and F2 in the first direction D1 can be made equal to the reflectivity of light incident on the first and second conductors F1 and F2 in the second direction D2, and thus reflection unevenness can be effectively suppressed. By setting the distance between the boundary portion BS and each disconnection point K to 200 μm or less (preferably, 100 μm or less), the reflection unevenness can be further suppressed. The difference between the reflectivity of light in the D1 direction and the reflectivity of light in the D2 direction can be, for example, less than 10% (preferably less than 5%).

As illustrated in FIGS. 2 and 6, a plurality of island-like conductors SD may be arranged in the boundary portion BS. The island-like conductor SD may have a reverse tapered shape in which the upper surface length is smaller than the lower surface length. As illustrated in FIGS. 2, 7, and 8, the disconnection point K may have a shape of a wiring line notch, and a notch length KL may be equal to or larger than a wiring line width HW. The notch length KL may be equal to or greater than the wiring line thickness.

Figure 9:
FIG. 9 is a schematic cross-sectional view illustrating a configuration of a display device according to the present embodiment.
Figure 9:
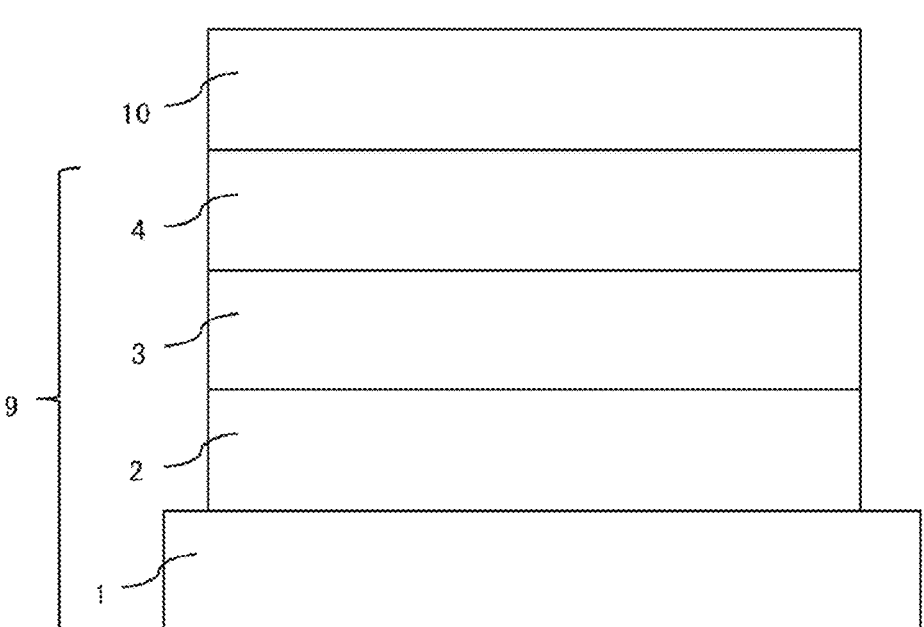

FIG. 9 is a schematic cross-sectional view illustrating a configuration of a display device according to the present embodiment. As illustrated in FIG. 9, a display device 20 includes a substrate 1, a pixel circuit layer 2, a light-emitting element layer 3, a sealing layer 4, and a touch sensor 10 in this order. The substrate 1, the pixel circuit layer 2, the light-emitting element layer 3, and the sealing layer 4 may constitute an OLED panel 9. In the display device 20, the touch sensor 10 may be monolithically formed on the OLED panel 9 (so-called on-cell structure). The substrate 1 may have flexibility.

Figure 10:
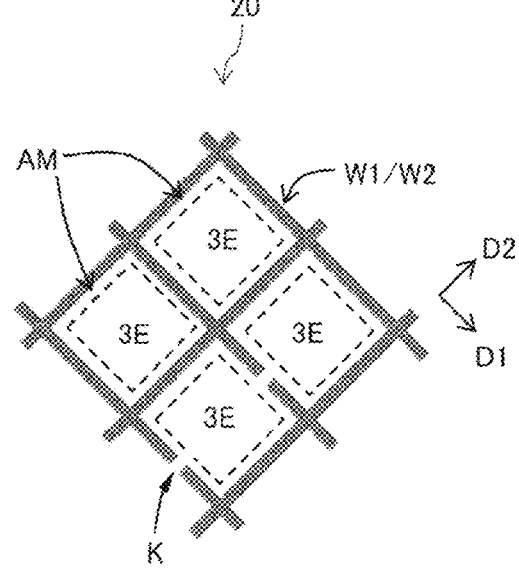
FIG. 10 is a plan view illustrating a configuration of the display device according to the present embodiment.

FIG. 10 is a plan view illustrating a configuration of the display device according to the present embodiment. In the display device 20, light-emitting regions 3E of the respective light-emitting elements (for example, organic light-emitting diodes or quantum dot light-emitting diodes) included in the light-emitting element layer 3 may be located in the meshes AM of the net-like wiring lines W1 and W2 in a plan view. Since the touch sensor 10 of the present embodiment has high sensitivity, a vertical scanning period for driving the OLED panel 9 and a sensing period of the touch sensor 10 can be overlapped (in time).

APPENDIX

The embodiments described above are for the purpose of illustration and description and are not intended to be limiting. It will be apparent to those skilled in the art that many variations will be possible in accordance with the illustration and description.

REFERENCE SIGNS LIST

10 Touch sensor
20 Display device
F1 First conductor
F2 Second conductor
W1, W2 Net-like wiring line
K Disconnection point
ED Disconnection edge
EK Boundary edge
BS boundary portion
AM Mesh (of net-like wiring line)

The invention claimed is:

1. A touch sensor comprising:

a plurality of first sensing lines extending in a first direction and having a first net-like wiring structure; and a plurality of second sensing lines extending in a second direction orthogonal to the first direction and having a second net-like wiring structure, wherein:

the first net-like wiring structure and the second net-like wiring structure are different from each other, but are formed in a same conductive layer, the first and second net-like wiring structures are electrically insulated at a boundary portion, at least a part of the boundary portion between the first net-like wiring structure and the second net-like wiring structure extends in a third direction intersecting the first direction and the second direction, the first net-like wiring structure includes, near the boundary portion, a plurality of first disconnection points in which a disconnection edge intersects the third direction in a plan view, and the second net-like wiring structure includes, near the boundary portion, a plurality of second disconnection points in which a disconnection edge intersects the third direction in the plan view.

2. The touch sensor according to claim 1, wherein the plurality of first disconnection points and the plurality of second disconnection points have a shape of a wiring line notch.

3. The touch sensor according to claim 2, wherein, in the shape of the wiring line notch, a notch length is equal to or greater than a wiring line width of at least one of the first net-like wiring structure or the second net-like wiring structure.

4. The touch sensor according to claim 2, wherein, in the shape of the wiring line notch, a notch length is equal to or greater than a wiring line thickness of at least one of the first net-like wiring structure or the second net-like wiring structure.

5. The touch sensor according to claim 1, wherein the plurality of first disconnection points is provided in such a manner that a first current path is configured to be formed entirely in the first net-like wiring structure, and
the plurality of second disconnection points is provided in such a manner that a second current path is configured to be formed entirely in the second net-like wiring structure.

6. The touch sensor according to claim 1, wherein each of the first net-like wiring structure and the second net-like wiring structure has a plurality of boundary edges facing the boundary portion, and
in the first net-like wiring structure, when a total number of the plurality of boundary edges is M and a number of the plurality of first disconnection points is N, N divided by M is between 0.75 and 1.25, inclusive.

7. The touch sensor according to claim 1, wherein a plurality of island-like conductors is located in the boundary portion, and the plurality of island-like conductors and the first net-like wiring structure are formed in the same conductive layer.

8. The touch sensor according to claim 1, wherein a distance between the boundary portion and each of the plurality of first disconnection points is within 200 μm.

9. The touch sensor according to claim 1, wherein an outer shape of each of the first net-like wiring structure and the second net-like wiring structure is a V shape.

10. The touch sensor according to claim 1, wherein a width of the boundary portion is equal to or less than twice a mesh diameter of the first net-like wiring structure.

11. The touch sensor according to claim 1, wherein the disconnection edge of the plurality of first disconnection points and the disconnection edge of the plurality of second disconnection points are orthogonal to the third direction in the plan view.

12. A display device comprising:
the touch sensor according to claim 1; and
a light-emitting element in which a light-emitting region is located in a mesh of the first net-like wiring structure and the second net-like wiring structure in the plan view.

13. The touch sensor according to claim 1, wherein a mesh formed by the first net-like wiring structure has a rectangular shape including sides parallel to the third direction and sides parallel to a fourth direction orthogonal to the third direction.

14. The touch sensor according to claim 13, wherein the plurality of first disconnection points includes two disconnection points arranged in the fourth direction in an annular portion surrounding the mesh.

15. The touch sensor according to claim 14, wherein, with the two disconnection points as lattice cut portions, the lattice cut portions are arranged in a staggered manner when viewed in the fourth direction.

16. The touch sensor according to claim 1, wherein the first direction intersects at an angle of +45 degrees or −45 degrees with respect to the third direction.

17. The display device according to claim 12, wherein the light-emitting element includes a light-emitting layer and a sealing layer, and
the light-emitting layer, the sealing layer, and the touch sensor are stacked on top of one another in this order.

18. The touch sensor according to claim 13, wherein the first net-like wiring structure does not have a disconnection point in a portion extending in the fourth direction.

19. The touch sensor of claim 13, wherein a difference between a reflectivity of light incident on the first net-like wiring structure and the second net-like wiring structure from the first direction and a reflectivity of light incident on the first net-like wiring structure and the second net-like wiring structure from the fourth direction is less than 10%.

20. The touch sensor of claim 1, further comprising:
an electrostatic capacitance between one of the plurality of first sensing lines and one of the plurality of second sensing lines,
wherein, when a sensing target approaches the touch sensor, the electrostatic capacitance changes such that a position of the sensing target is specified.

* * * * *